May 19, 1931.  C. F. REIS  1,805,598

IMPULSE COUPLING

Filed Dec. 6, 1929

Inventor
Curt F. Reis
By Eccleston & Eccleston,
Attorneys

Patented May 19, 1931

1,805,598

UNITED STATES PATENT OFFICE

CURT FREDERICK REIS, OF CHICAGO, ILLINOIS, ASSIGNOR TO EXCEL MAGNETO COMPANY, OF CHICAGO, ILLINOIS

IMPULSE COUPLING

Application filed December 6, 1929. Serial No. 412,235.

This invention relates to impulse couplings or starters for use in connection with ignition apparatus employed for furnishing ignition for the engines of tractors, aeroplanes, automobiles and other vehicles in which internal combustion engines are employed.

One of the objects of the invention consists in the provision of a strong and durable device of this description formed of few parts and in which the main parts are made of die castings, and the wearing parts are cast therein, thereby providing both cheapness of manufacture as well as durability.

Another object of the invention resides in the provision of an impulse coupling in which means are provided for minimizing the shock to the parts when the driven member is snapped forward by the spring, whereby wear and tear on the parts is greatly reduced and the life of the coupling increased.

A further object of the invention consists in providing a novel anchoring means for the ends of the spring which imparts the rapid impulse to the driven member and the magneto rotor to which it is attached.

A further object of the invention consists in the provision of an impulse coupling so designed that the number of revolutions of the engine necessary to render the coupling inoperative may be varied in accordance with the relative circumferential position of the coupling casing and the magneto casing.

Another object of the invention resides in constructing a coupling which may be assembled for either a clockwise or counterclockwise drive or which may be converted from the one to the other.

Other objects and advantages of the invention will be apparent from the following description when taken in connection with the accompanying drawings, in which.

Figure 1:
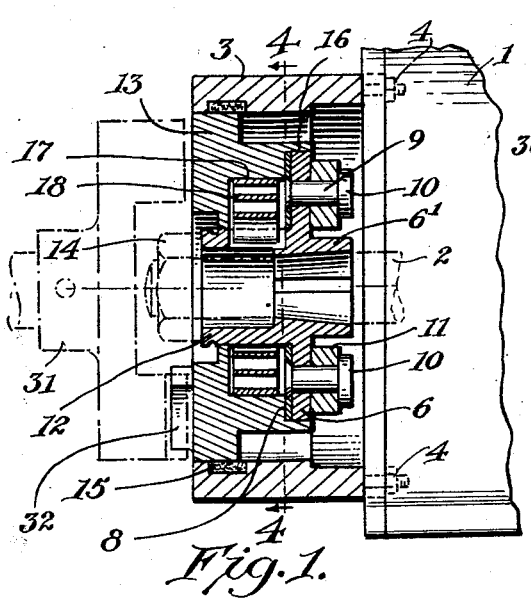
Figure 1 is a sectional view through the novel coupling showing the same attached to a magneto casing.

Referring to the drawings in greater detail the numeral 1 indicates the housing of a magneto or other ignition apparatus for furnishing the ignition for internal combustion engines, and the numeral 2 indicates the shaft of the conventional rotor used in such apparatus. A casing or housing 3 of aluminum or the like, is provided for the impulse coupling or starter to be described, and may be bolted to the ignition housing as indicated by the numeral 4 or may be cast integral therewith if desired.

Mounted on the end of shaft 2 and keyed thereto, is a driven member 6 provided with a hub 6' for imparting initial rotary movement to the rotor of the magneto, as will be described hereinafter. This member 6 is of substantially circular shape except for a cutout portion 7 and may be made of bronze or other alloy. A nut 14 serves to secure the driven member 6 to the shaft 2. In order to prevent undue wear on this plate, an annular reinforcing member or wear plate 8 is permanently secured thereto as by pins 9. These pins are provided with heads 10 and serve as pivots for pawls 11.

Mounted on a rearward extension 12 of the hub 6' of the driven member is a driving member 13. This member 13 is of circular formation and fits snugly within the outer end of the casing 3. A lubricating washer 15 is preferably seated in an annular recess on the inner surface of the casing 3 and in contact with the periphery of the driving member 13 for the purpose of excluding dust from the interior of the casing as well as for lubricating purposes.

The driving member 13 is provided with two circular pockets 16 and 17; the inner and smaller pocket 17 serving to receive a spiral spring 18, and the outer and larger pocket 16 serving as a seat for the driven member 6. The spiral spring 18 has its respective ends anchored to the driving member 13 and the driven member 6, and for this purpose the ends of the spring are coiled upon themselves to provide substantially cylindrical lugs 19 and 20. These lugs are seated in substantially cylindrical grooves 21 and 22 formed respectively on the driving member and the driven member. By thus anchoring the ends of the spring no sharp bends are necessary in the material of which the spring is composed, and thus the possibility of snapping off the anchoring means is reduced to a minimum.

As already mentioned the driven member 6 is provided with an arcuate notch 7 in its outer periphery and the end walls of this notch cooperate with an inwardly extending protuberance 23 formed on the inner wall of the pocket 16 to serve as stops to limit the relative movements between the driving member 13 and the driven member 6. As will be understood by those skilled in the art, the spring 18 serves to impart a rapid rotary movement to the driven member 6 and in order to absorb the shock attendant to the abrupt stoppage of this rotary movement, a shock absorbing element 24 is provided. This element 24 is seated in a cylindrical groove 25 similar to groove 21 and on the opposite side of the protuberance 23. The element 24 may consist of a roll of compressed linen treated with phenol, or any other similar shock absorbing element may be provided. This element, as already mentioned, is seated in a cylindrical groove 25 and extends upwardly into the outer pocket 16 so as to be exposed for engagement with a wall of the notch 7 in the member 6.

The outer ends of the pawls 11 are adapted to engage a lug on the casing 3 for the purpose of temporarily halting the rotary movement of the driven member so as to store up energy in the spiral spring 18, as will be readily understood; and in the present construction this lug which is indicated by the numeral 26 is cast in a pocket 27 formed in the casing. The engaged pawl is released at the proper time by means of a releasing pin 26' positioned in a pocket 26" in the driving member and adapted to engage the outer end of the pawl after movement of the driven member 6 is temporarily halted by the lug. For the purpose of lubricating the lug 26 and reducing wear on the parts, a lubricating wick 28 is provided. This wick is anchored in a pocket 29 formed on the interior of the casing 3, and a similar pocket 29 is provided on the opposite side of the stop lug 26 also for the purpose of anchoring a lubricating wick when the device is used in connection with an ignition device operating in a direction opposite to that for which the present construction is intended. At each operation of the device the outer end of one of the pawls 11 will engage the wick 28 and transfer some of the lubricant to the lug 26.

The inner end of each of the pawls 11 is provided with a weight 30 which in certain positions of the driven member at excessively slow speeds of the latter, will cause the outer ends of the pawl to project beyond the periphery of the driven member so as to engage the stop lug 26. When the driven member is rotating at speeds at or above the minimum for which the engine is set to rotate, these weights, due to centrifugal force, will maintain the outer ends of the pawls in their inner-most positions so as to prevent their engagement with the lug 26. However, if for any reason the engine slows down below the minimum predetermined speed, the weights 30 will again cause the outer ends of the pawls to project outwardly so as to again engage the stop lug 26 and thereby impart rapid rotary impulses to the driven member 6 to create sufficient spark to ignite the gases. It will thus be apparent that the coupling serves not only to impart a rapid rotary impulse to the rotor of the ignition device when initially starting the engine, but that it also serves to impart such impulses to the rotor whenever the engine slows down below the minimum speed for which it is set.

Figure 2:
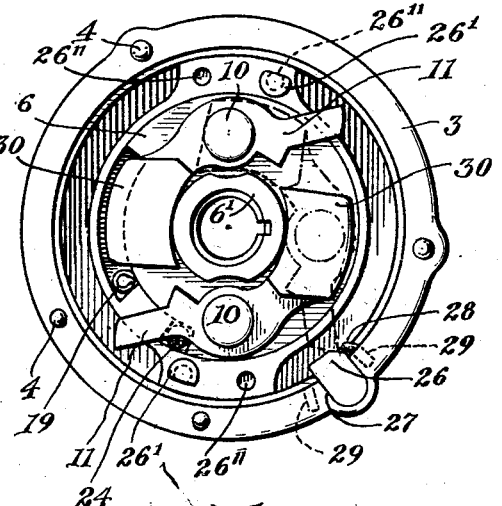
Figure 2 is a plan view of the coupling removed from the magneto, showing in dotted outline the operative position of one of the pawls.
Figure 3:
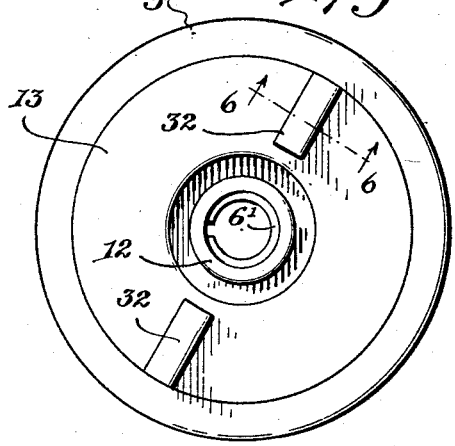
Figure 3 is an end view of the coupling in operative position.
Figure 4:
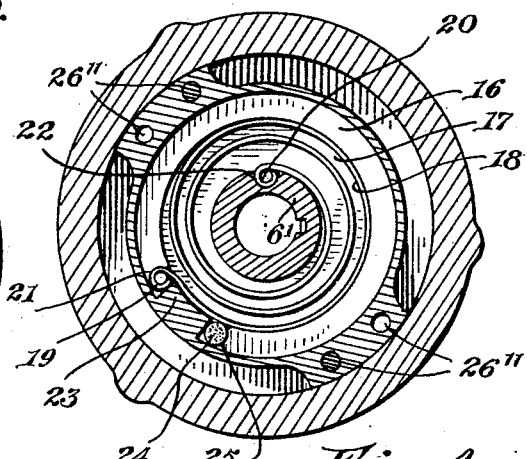
Figure 4 is a sectional view taken on line 4—4 of Figure 1.
Figure 5:
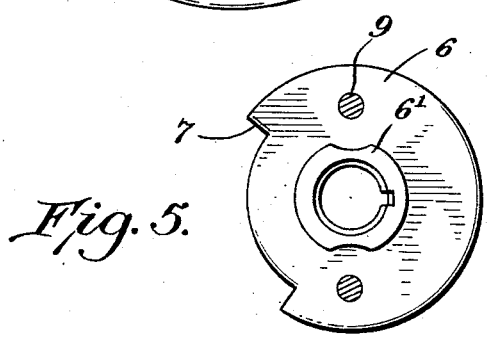
Figure 5 is a plan view of the driven member of the coupling.

It is to be noted that the various types of internal combustion engines now on the market are set for different minimum speeds below which the engines will stop, and in this connection it may be mentioned that the present impulse coupling is so designed as to be capable of use with any of these engines irrespective of their minimum speed and without alteration of the construction of the coupling. Not only is this true in connection with the initial starting of the engine, but also for the purpose of imparting a rapid impulse to the rotor of the ignition apparatus should the engine slow down below its minimum speed. This adaptability of the coupling is rendered possible by merely varying the circumferential position of the casing 3 so that the stop lug 26 may be in the circumferential position best suited to the particular machine. For instance, if the casing 3 is applied to the ignition apparatus so that the lug 26 is in the horizontal plane of the shaft 2 a greater number of revolutions per minute will be necessary to maintain the outer ends of the pawls 11 in their inner-most position, than will be necessary when the lug 26 is positioned near the vertical plane of the shaft 2, as indicated in Figure 2. Obviously, in this latter position a smaller number of revolutions per minute will be necessary to maintain the pawls in their inoperative position, due to the fact that the weight 30 will be almost directly above the pivot 10 of the pawl and thus more readily thrown outwardly. It will be seen, therefore, that in order to adapt the present impulse coupling to motors having different minimum speeds, it is only necessary that the proper relative position of the casing of the coupling be selected.

The present coupling is intended for use with ignition devices operating in the clockwise as well as the counter-clockwise direction, and it is for this reason that a second pocket 29 is provided for the lubricating wick 28, as it will be understood that when the ignition device operates in a clockwise direction the pawls 11 will engage stop lug 26 from the opposite direction. Also in order that the coupling may be adapted to either type of ignition device, two sets of the diametrically opposed pockets 26'' are provided, to the end that the pins 26' may be moved to proper position for cooperating with the pawls when the driving member is operating in the opposite direction. And again, the spiral spring 18 will also be reversed, that is, it will be turned over with its opposite face adjacent the bottom of the pocket 17 and with its anchoring lug seated in the groove 25, which is used in the present disclosure for receiving the shock absorbing element 24; and of course, the shock absorbing element 24 will be placed in the groove 21, thus transposing the positions of these two elements. Furthermore, the positions of the pawls 11 with respect to their pivots 9 will be reversed, that is to say, the operative ends of the pawls will be so placed as to extend in the direction of rotation of the driving member. And, of course, when operating in the direction opposite to that indicated in the drawings the casing 4 will be moved to a position such that the stop lug 26 will be to the left of the bottom center of the device rather than to the right thereof, as indicated in Figure 2.

Figure 6:
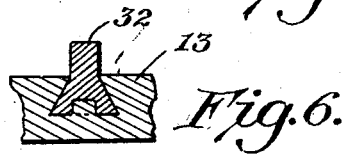
Figure 6 is a detail sectional view taken on line 6—6 of Figure 3.

As will be understood, the driving member 13 is operated from the timing shaft which is conventionally shown in part in dotted outline in Figure 1, and indicated by the numeral 31, and for cooperating with the claw mounted on the end of the timing shaft lugs 32 are provided on the outer face of the driving member 13. These lugs are, of course, subject to considerable wear and in the present construction are formed of steel, and as shown in Figure 6, are cast in recesses formed in the outer face of the member 13. This element 13 may be formed of aluminum, bronze, or the like, and by casting therein the steel lugs 32, the advantages of an aluminum or bronze driving member are provided without sacrificing the durability of the apparatus which would be greatly lessened if integral lugs of aluminum or bronze were employed.

The operation and function of the various parts of the coupling have been described in connection with the detailed description of the parts and a repetition of the operation of the apparatus is not believed necessary.

From the foregoing description taken in connection with the accompanying drawings it will be apparent that a comparatively simple and inexpensive coupling has been provided which is both strong and durable in operation; that means have been incorporated in the coupling to absorb the shock on the moving parts so as to greatly prolong the life of the coupling; that novel means have been provided for anchoring the ends of the spiral spring so as to minimize the liability of breakage to the spring at the points of attachment to the driving member and driven member; that the coupling is so designed as to adapt it to motors adjusted to different minimum speeds by merely selecting the proper circumferential position for the coupling casing; and that the coupling is adapted for use with ignition devices of the clockwise or counter-clockwise type, by merely reversing certain of the positions of the parts in assembling the coupling.

In accordance with the patent statutes the preferred embodiment of the coupling has been fully described, but it will be readily apparent that various minor changes may be made in the details of construction without departing from the spirit of the invention and all such changes are intended to be included within the scope of the appended claims.

What I claim as new and desire to secure by Letters Patent is:

1. In an impulse coupling for magnetos, a driving member, a driven member, a spring for imparting a rapid impulse to said driven member, and a cushioning member comprising a coiled fabric for absorbing the shock to the parts at the termination of said rapid impulse.

2. In an impulse coupling for magnetos, a driving member, a driven member, a casing in which said members are mounted, a stop lug on the interior of said casing, pawls on said driven member adapted to engage said stop lug, a spiral spring disposed between said members with its ends seated in recesses formed in the respective members, pins on said driving member for disengaging the pawls from the stop lug, said driving member provided with a second recess, and a shock absorbing member seated in said last-named recess.

3. A reversible impulse coupling for magnetos including, a driving member, a driven member, a casing in which said members are mounted, a stop lug on the interior of said casing, pawls on said driven member adapted to engage said stop lug, a spiral spring disposed between said members with its ends seated in recesses formed in the respective members, pins on said driving member for disengaging the pawls from the stop lug, said driving member provided with a second recess, a shock absorbing member seated in said last-named recess, said recesses being so arranged that the positions of the spiral spring and shock absorbing member may be reversed.

4. A reversible impulse coupling for magnetos including, a driving member, a driven member, a casing in which said members are mounted, a reversible stop lug on the interior of said casing, pawls on said driven member adapted to engage said lug, a spiral spring disposed between said members with its ends seated in recesses formed in the respective members, said driving member provided with two pairs of diametrically opposed, pin receiving recesses, pins mounted in one of said pairs of recesses and adapted to disengage said pawls from the stop lug, said driving member provided with another recess, a shock absorbing member seated in said last-named recess, all of said recesses being so arranged that the positions of the spiral spring, shock absorbing member, and pins may be reversed.

5. In an impulse coupling for magnetos, a driving member, a driven member, a casing in which said members are mounted, a stop lug on the interior of said casing, pawls on said driven member adapted to engage said stop lug, a lubricating wick disposed adjacent said stop lug for lubricating the latter and adapted to be successively engaged by said pawls.

6. In an impulse coupling for magnetos, a driving member, a driven member, and steel driving lugs anchored in the face of said driving member.

7. In an impulse coupling for magnetos, a driving member, a driven member, said driving member formed of aluminum, and steel driving lugs cast in the face of said driving member.

8. In an impulse coupling for magnetos, a driving member, a driven member, a casing in which said members are rotatably mounted, a spiral spring disposed between said members and having its respective ends connected thereto, a stop for limiting the relative movement between said driving and driven members, pawls pivoted on said driven member, weights on the inner ends of said pawls for throwing the outer ends of the pawls beyond the periphery of the driven member under certain conditions, a stop lug on the inner face of said casing adapted to be engaged by the outer ends of said pawls when the driven member is rotating at less than a predetermined speed, the parts being so designed that the predetermined speed may be varied in accordance with the circumferential position of the stop lug.

9. A reversible impulse coupling for magnetos including, a driving member, a driven member, a casing in which said members are mounted, a stop lug on the interior of said casing, pawls on said driven member adapted to engage said stop lug, a spring disposed between said members, means for securing the spring in operative position, pins on said driven member for disengaging the pawls from the stop lug, means for securing a shock absorbing member on the driving member, the means for securing the spring and shock absorbing element being so arranged that the positions of the spring and shock absorbing member may be reversed.

CURT FREDERICK REIS.